United States Patent

Barten et al.

Patent Number: 5,378,861
Date of Patent: Jan. 3, 1995

[54] AUTOMATIC SETTING OF THE PARAMETERS OF A PROFILE GENERATOR FOR A HIGH PERFORMANCE ELEVATOR DOOR SYSTEM

[75] Inventors: Michael Barten; Mustapha Toutaoui, both of Berlin, Germany

[73] Assignee: Otis Elevator Company, Farmington, Conn.

[21] Appl. No.: 17,730

[22] Filed: Feb. 16, 1993

[51] Int. Cl.⁶ .............................................. B66B 13/14
[52] U.S. Cl. ................................................... 187/316
[58] Field of Search ................... 187/103, 104; 49/117, 49/118, 120

[56] References Cited

U.S. PATENT DOCUMENTS

Re. 33,668  8/1991  Gray ..................................... 250/221
4,342,379   8/1982  Games et al. ......................... 187/103
5,131,506   7/1992  Mizumo ............................... 187/103
5,162,711  11/1992  Heckler ................................ 318/264

Primary Examiner—Steven L. Stephan
Assistant Examiner—Robert Nappi

[57] ABSTRACT

In response to requested flight time, creep in distance, creep out distance and creep speed, a profile for opening or closing an elevator door is provided. The distance over which acceleration and deceleration must occur is the doorway distance less the distance which would be covered at the creep speed. Maximum speed is the acceleration distance over the acceleration time (¼ of the requested flight time, to allow for jerk to both increase and decrease both acceleration and deceleration). Acceleration is the maximum speed over the acceleration time, and jerk is acceleration over the acceleration time. Actual flight time is calculated, taking into account maximum acceleration and velocity, and periods of constant acceleration and velocity, if any.

1 Claim, 11 Drawing Sheets

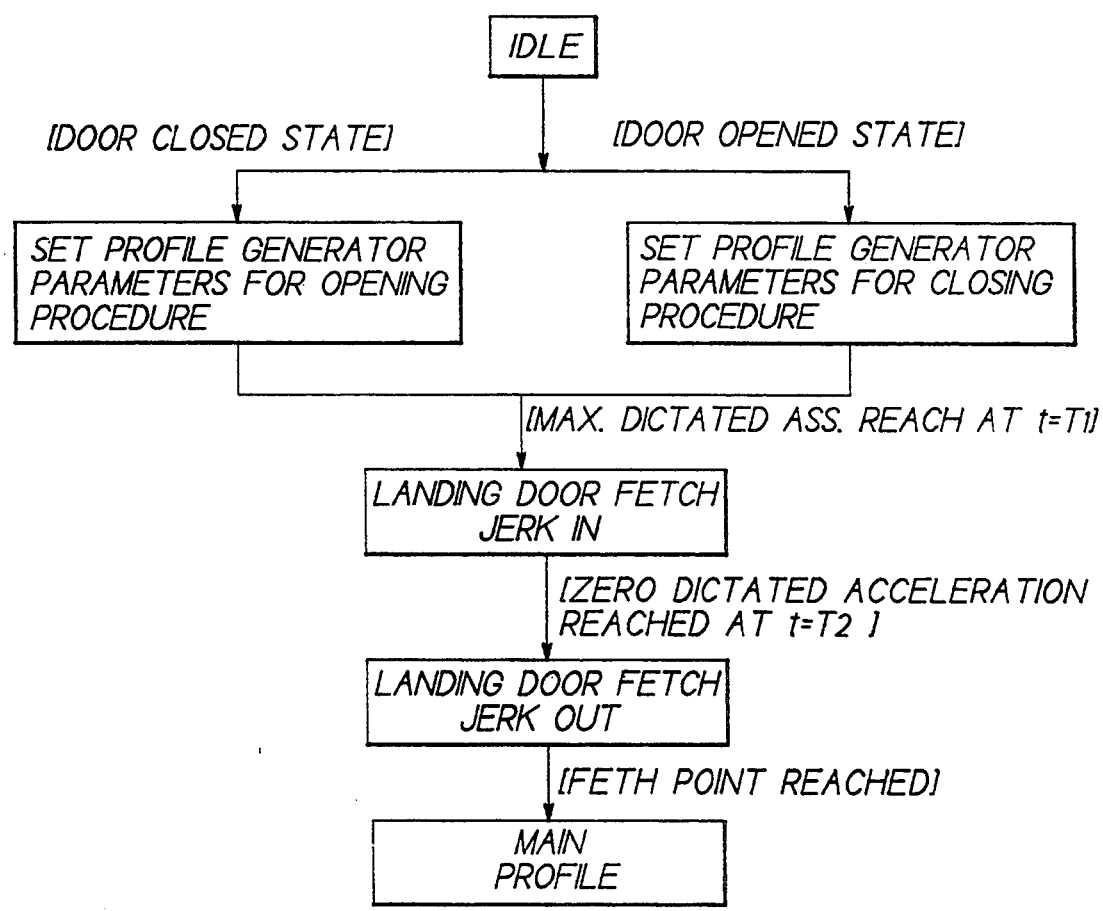
FIG. 1 DOOR MOVEMENT PRE-PHASE STATE GRAPH

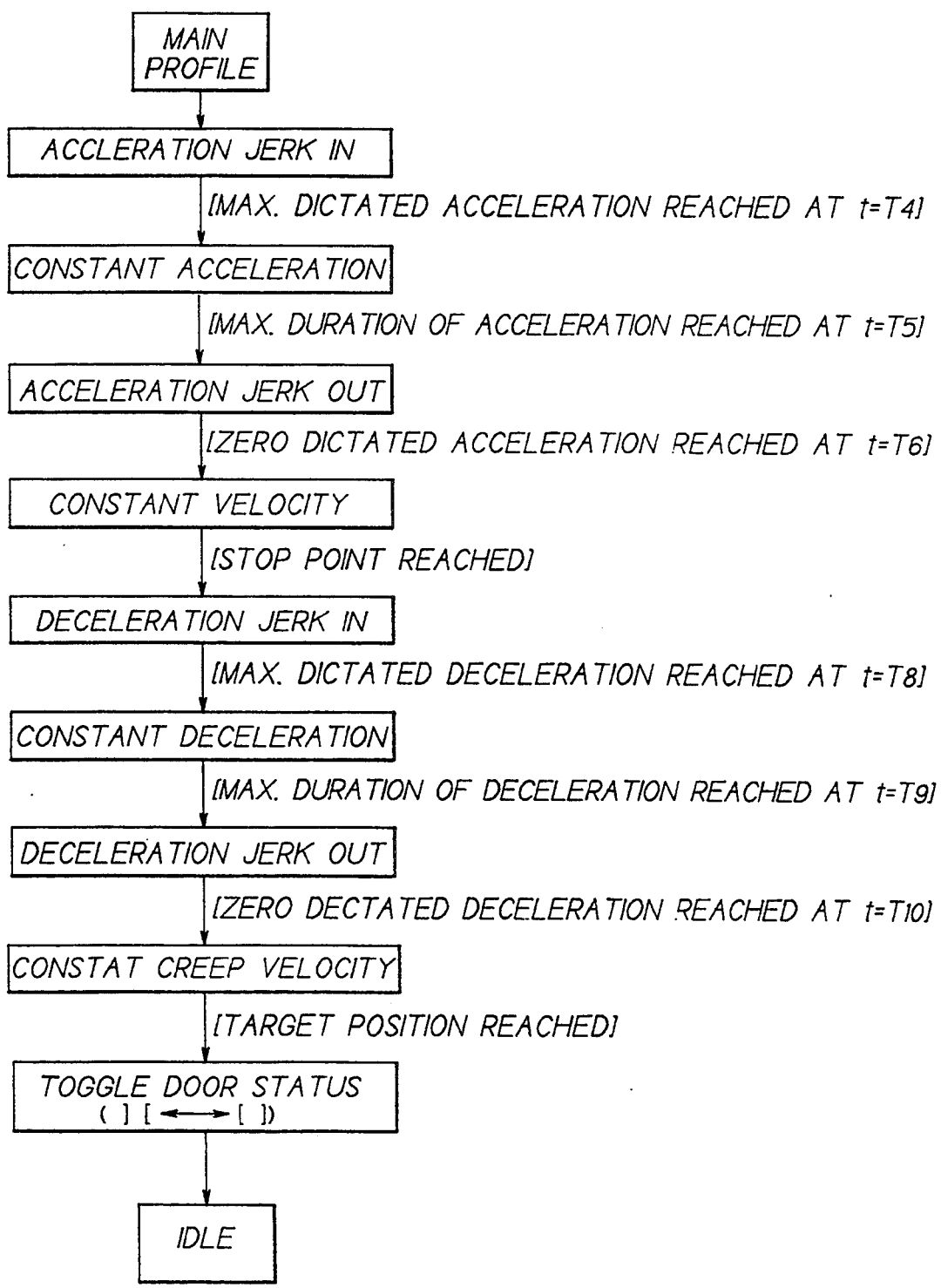
FIG. 2 MAIN PROFILE STATE GRAPH

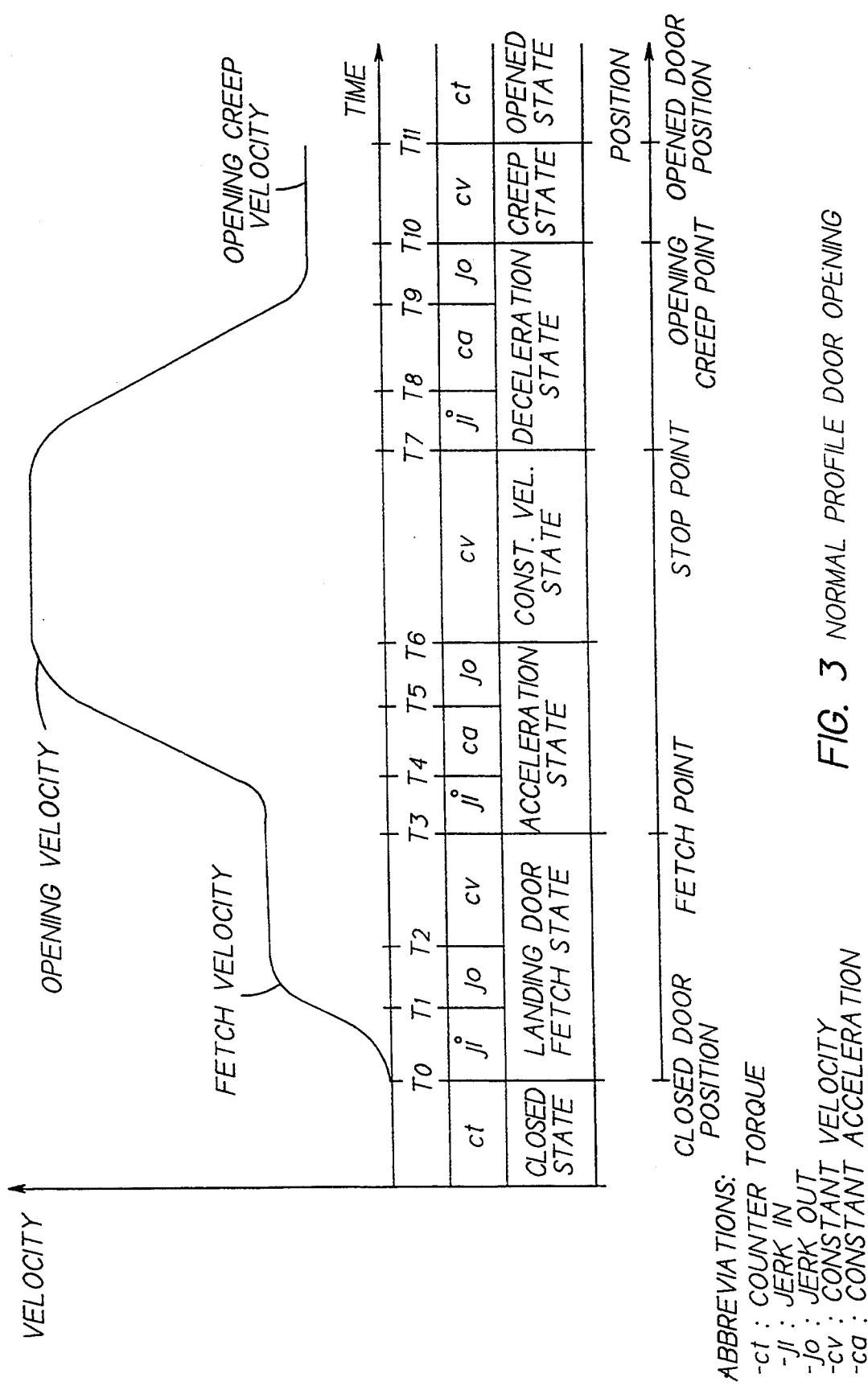
FIG. 3 NORMAL PROFILE DOOR OPENING

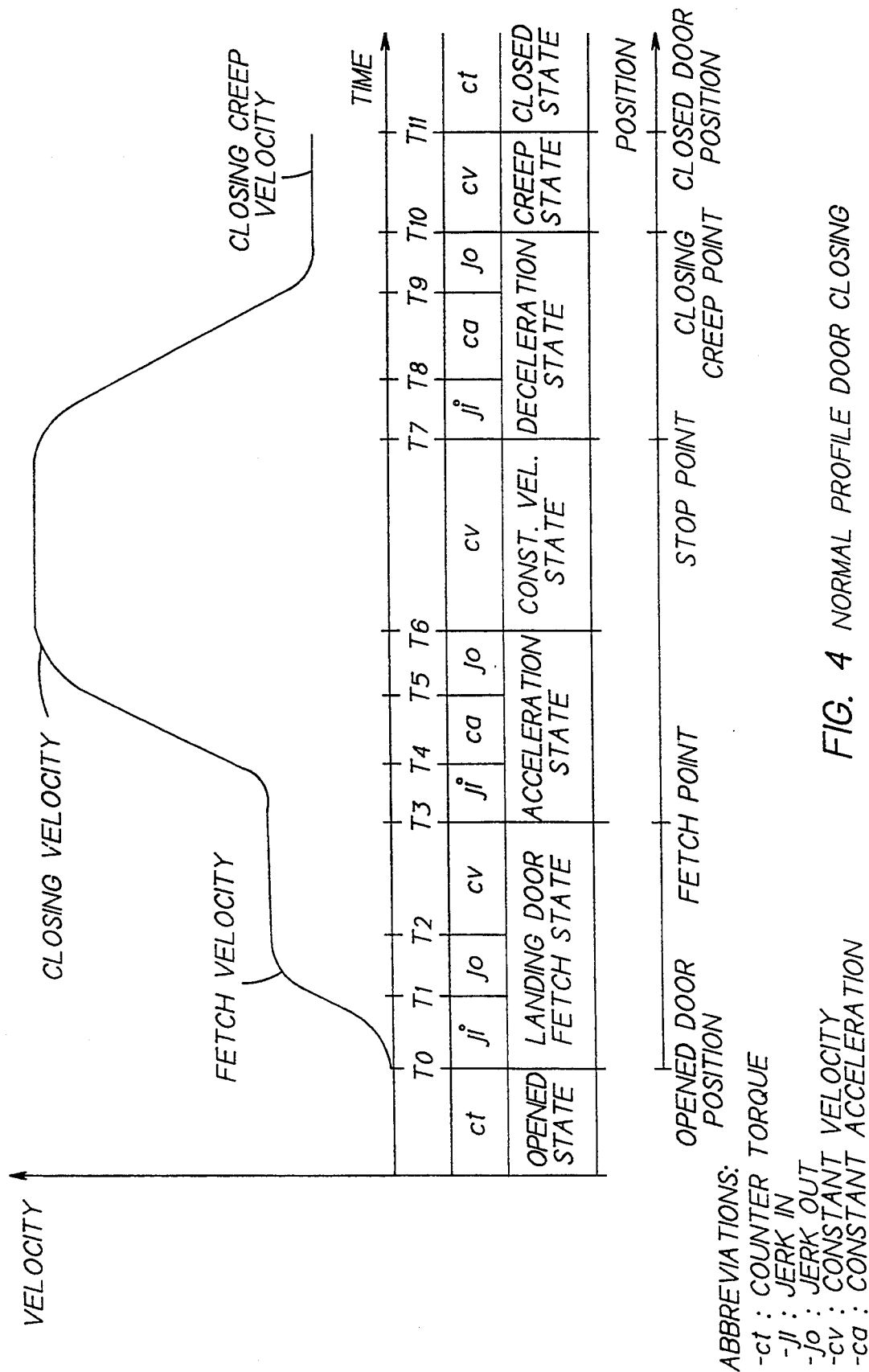
FIG. 4 NORMAL PROFILE DOOR CLOSING

DOOR OPENING RUN
1: VELOCITY PROFILE
2: ACCELERATION PROFILE

DOOR CLOSING RUN
1: VELOCITY PROFILE
2: ACCELERATION PROFILE

FIG. 5 PROFILE BREAK STATE GRAPH
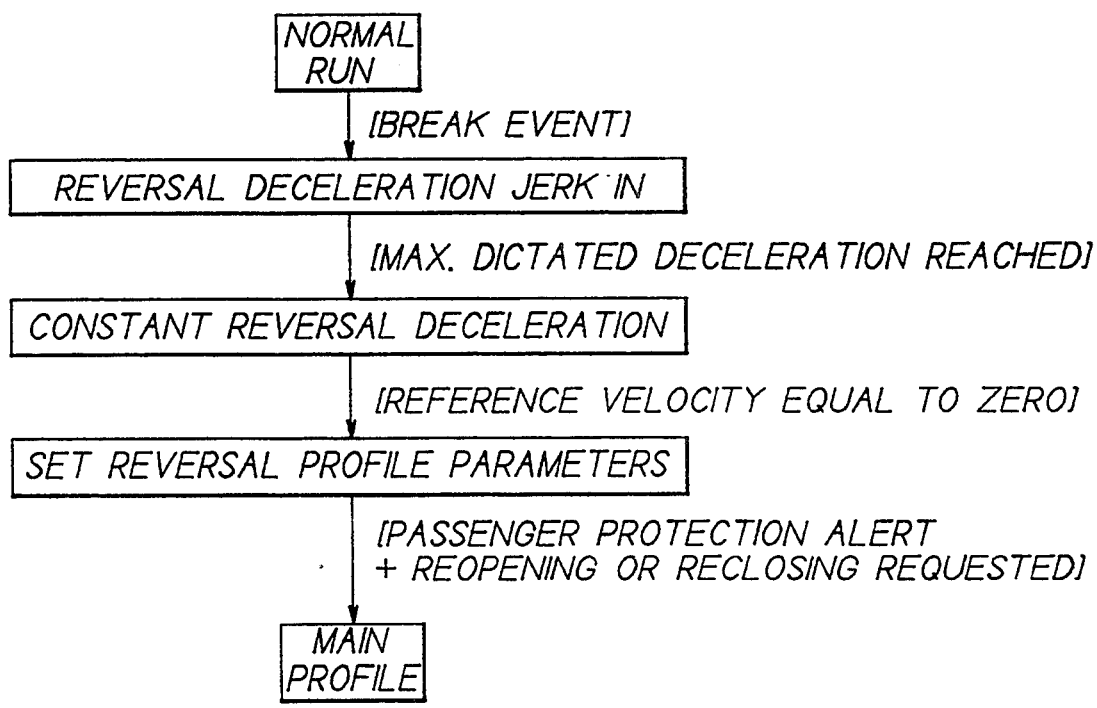
FIG. 11
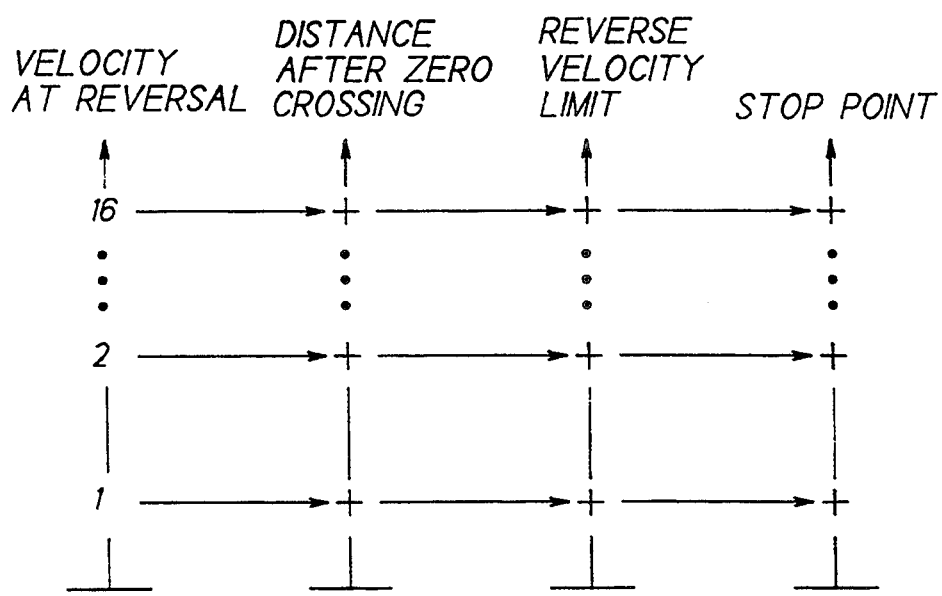

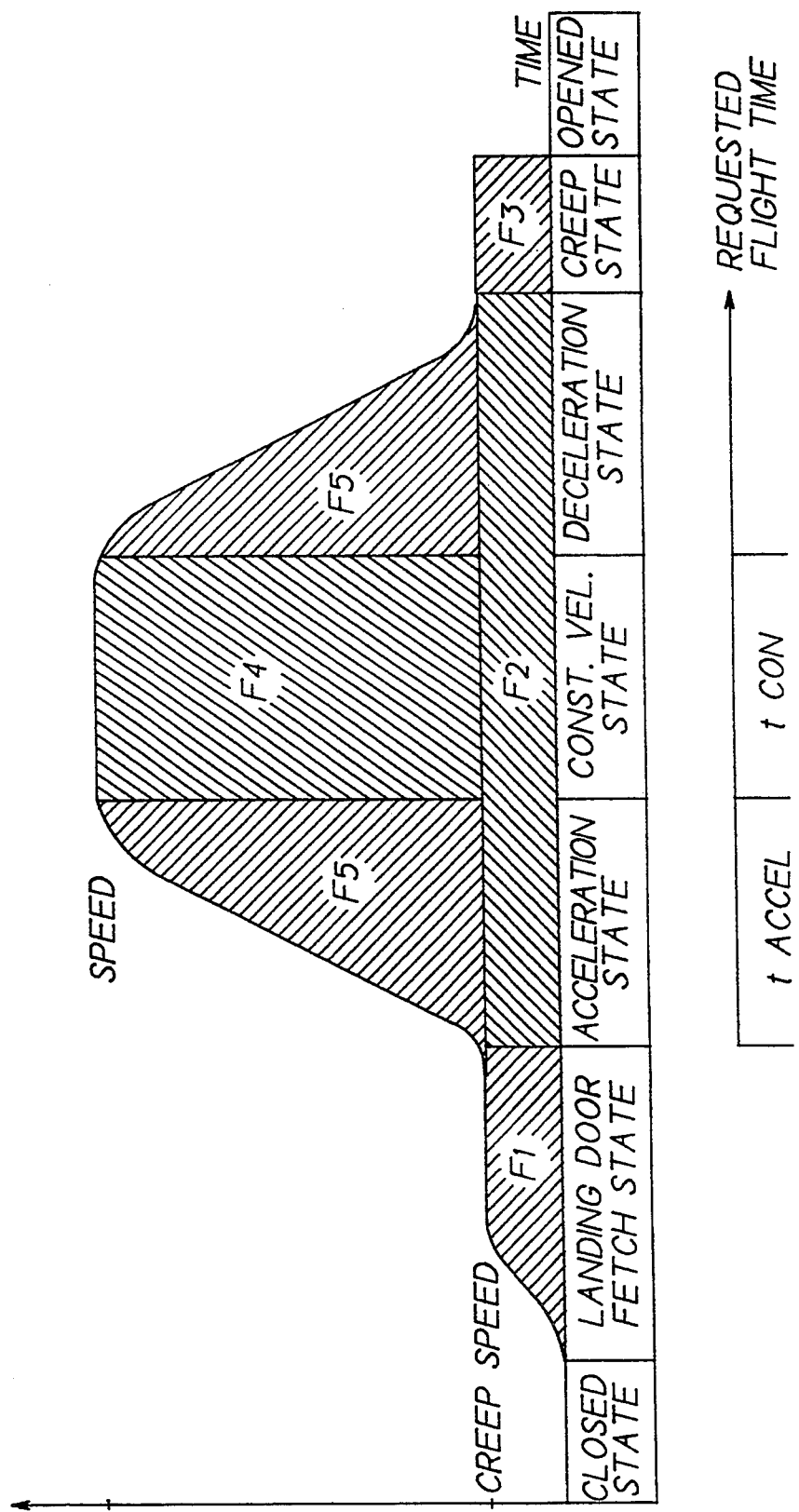
FIG. 6 NORMAL PROFILE RUN

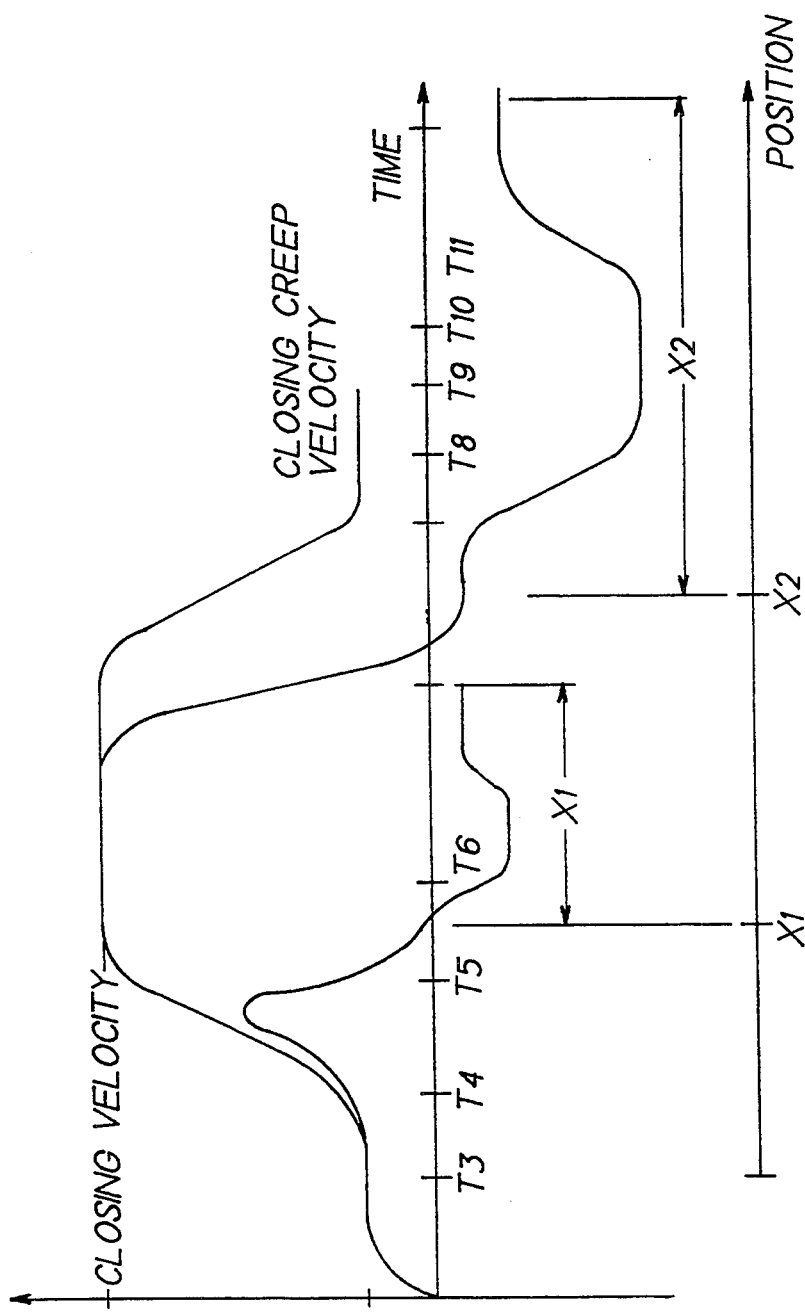
FIG. 7 REVERSAL PROFILE

DOOR REVERSAL RUN
FROM OPENING TO CLOSING
1: VELOCITY
2: ACCELERATION

DOOR REVERSAL RUN
FROM CLOSING TO OPENING
1: VELOCITY
2: ACCELERATION a.) WITHOUT CORRECTION   1: POSITION DICTATION
                         2: MEASURED POSITION b.) WITH CORRECTION

AUTOMATIC SETTING OF THE PARAMETERS OF A PROFILE GENERATOR FOR A HIGH PERFORMANCE ELEVATOR DOOR SYSTEM

BACKGROUND OF THE INVENTION

1. Field of the invention

The present invention relates to setting the parameters of an elevator door system.

2. Description of the Prior Art

An elevator high performance door system should fulfill different requirements concerning the opening/closing time, which should be given external to the door system. Another requested performance is to achieve good stopping without oscillations for the different operation modes like the normal run for the complete doorway (opening or closing) and the reversal run when the door has to change suddenly the run direction.

In order to bring the door to standstill, the profile generator should provide the appropriate parameters (jerk, deceleration) in a way that the prescribed stopping way (or point) must be reached properly and not exceeded. To realize a door controller at low cost, a very small microcomputer (e.g., 8-bit) may be used. In such, the calculations for door velocity profiles take an excessive amount of time.

SUMMARY OF THE INVENTION

According to the present invention, profile generator parameters of an elevator door system are set up automatically.

In order to reduce the calculation time for the parameters during the sampling time, the profile parameters are calculated and stored in look-up tables during the initialization of the system. In other words, the parameters are pre-calculated.

The profile generator concept is based on the principle of look-up tables. This solution minimizes the required Central Processing Unit (CPU) execution time, due to the used 8-bit microcontroller. The time profile is calculated by an "on-line" frequency integrator. Therefore, only the actual acceleration, the actual velocity ant the requested values of the jerk, the acceleration and the velocity are necessary.

BRIEF DESCRIPTION OF THE DRAWING

FIG. 1 is a door movement prephase state graph.

FIG. 2 is a main profile state graph.

FIG. 3 is a graph of a normal door opening velocity profile versus time and position.

FIG. 4 is a graph of a normal door closing velocity profile versus time and position.

FIG. 5 is a profile break state graph.

FIG. 6 illustrates a normal profile run.

FIG. 7 illustrates a reversal velocity profile versus time and position.

FIG. 11 illustrates the concept of the door reversal profile look-up table.

DESCRIPTION OF THE PREFERRED EMBODIMENT

Figure 4A:
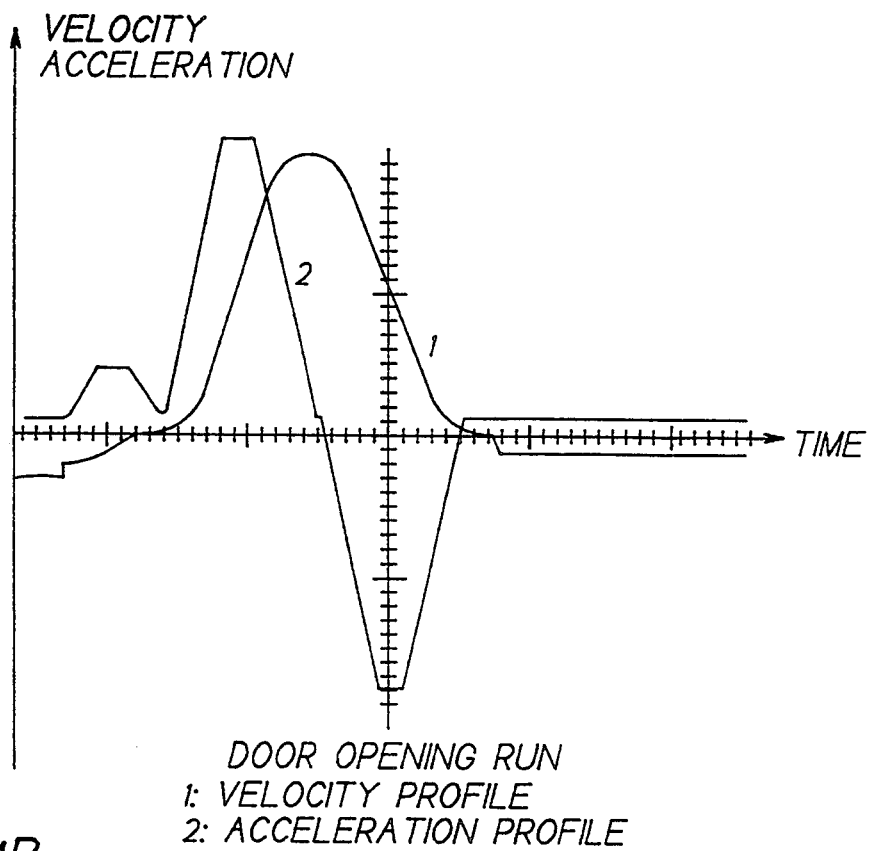
FIGS. 4A and 4B are graphs of velocity and acceleration profiles for door opening and door closing, respectively.

The profile generator provides the following profiles:
Normal run—door opening/closing; and
Reversal run.
The initialization of the profile generator consists of the following four (4) steps:

1. Acceptance of default parameter:

The default values of the profile generator are stored in an EEPROM and changeable externally into the door system. They first have to be transformed and then copied into the RAM-area.

2. Calculation of scaling values (auto-scaling):

The frequency integrator uses 16-bit integer arithmetic. An auto-scaling routine determines, depending on the maximum values which are given by the firmware scaling, the factors in such a way that the full 16-bit range is used. This ensures maximum resolution.

3. Profile parameter normalization:

Using the profile parameters determined in the previous steps, the resulting time profile can include undesired unsteadiness concerning the acceleration and the velocity. This is caused by the 16-bit arithmetic used. Therefore, internal profile parameters very close to the requested parameters must be calculated to avoid any unsteadiness.

4. Profile look-up table calculation:

This is explained above.

The time profile for the profile door opening given in FIG. 3 with the corresponding state graph (FIGS. 1 and 2) can be divided into four main parts;

1. Landing door fetch state:

During the very first millimeters of the car door movement, the car and landing doors will be coupled together by a mechanical link. To suppress noise and door vibrations the profile generator provides a low reference velocity until the landing door fetch is finished. This low velocity is referred to in FIGS. 4 and 5 as "fetch velocity", and referred to in FIGS. 6 and 9 as "creep speed". "Creep speed" also refers to the low velocity at the end of a door run. The "creep" distance or "creep way" is a distance the door moves at creep speed.

2. Acceleration and constant velocity state:

In regard to the given values of opening velocity, jerk-in, jerk-out, and acceleration, the switch points T4–T6 have to be calculated in such a way that a time optimal profile is obtained without torque peaks.

3. Deceleration state:

In the deceleration state, the same jerk and deceleration values are used as in the acceleration state. As a function of the dictated opening creep point and the given creep velocity, the stop point is determined. When the doors pass the stop point, the constant velocity state switches over to the deceleration state.

4. Creep state:

After the open creep out point the final door opened state is reached.

The time and position diagrams in FIG. 4 for the door closing profile are similar to the door opening procedure. Due to the necessary limitation of the kinematic energy, the closing velocity has to be less than the opening velocity. Although in the opened door position the car and the landing doors are coupled together, a backlash between the car and landing door must be taken into consideration. This is the reason for the landing door fetch state in the very beginning of the closing profile.

Figure 4B:
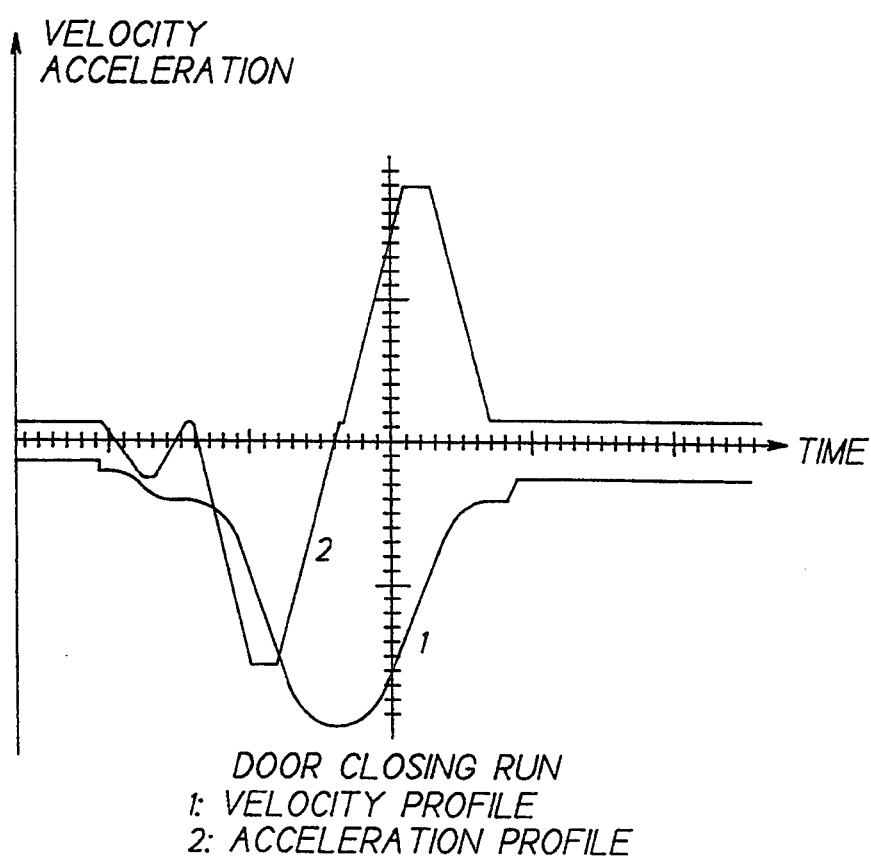
Figure 8A:
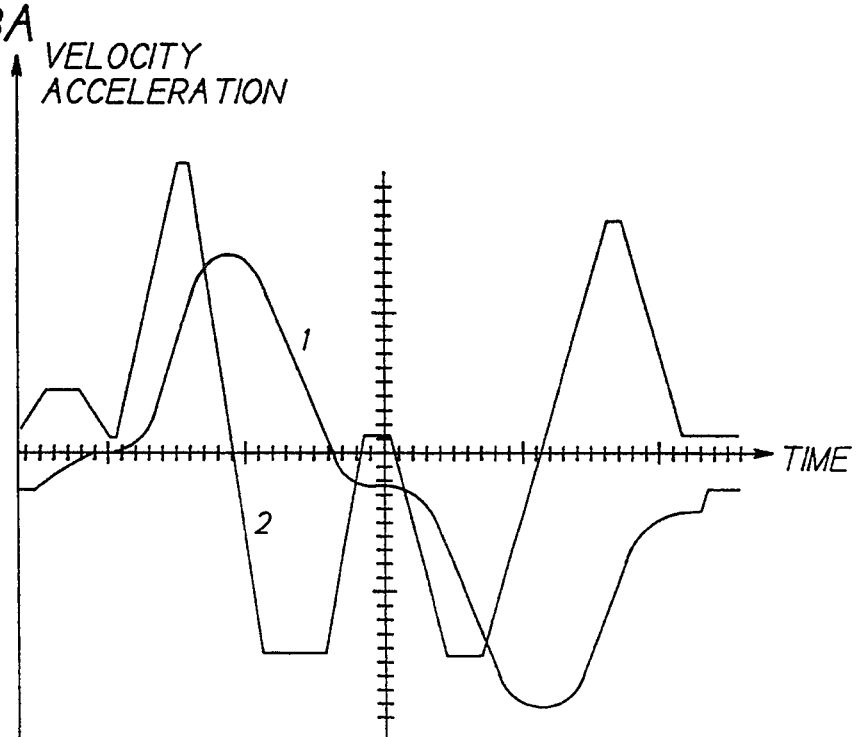
FIGS. 8A and 8B illustrate velocity and acceleration profiles for door reversals from opening to closing and closing to opening, respectively.
Figure 8B:
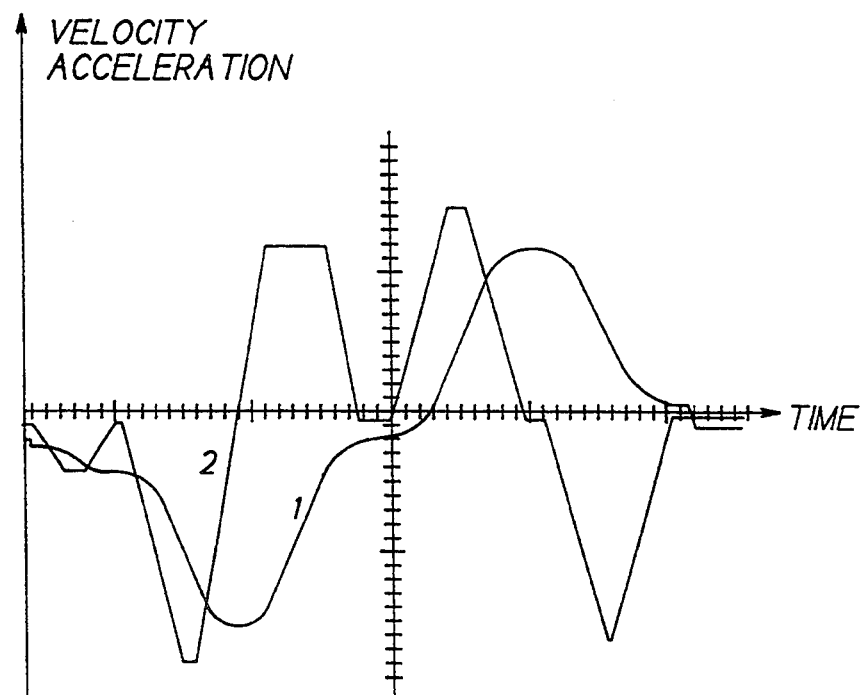

FIG. 4A corresponds to FIG. 3. FIG. 4B corresponds to FIG. 4. FIGS. 4A and 4B illustrate velocity and acceleration profiles after implementation of the present invention.

Each profile generator state can be interrupted by the occurrence of a reversal event coming from the passenger protection alert or when the door reopening/reclosing is requested.

At any time during the door closing/opening procedure, the passenger can force a reversal of the car and landing doors. The profile break state graph illustrates operation of the door system when the profile under which the door is moving is broken, for example, by a passenger in a car pressing a door open button while the door is closing or by use of a lambda device (see U.S. Pat. No. Re. 33,668). In a first step (see FIGS. 5 and 7) the actual reference velocity has to be decreased to zero under the condition that any unsteadiness of the acceleration/deceleration values must be avoided. When the velocity is crossing zero, the time profile is switched over to a conformist time optimal reversal profile.

The state graph of the reversal generator is depicted in FIG. 5.

The profile generator concept is based on the principle of look-up tables. This is because the reversal procedure requires variable time profiles. Because of the limited execution time of the profile generator, an "on-line" calculation of a time optimal reversal profile cannot be realized.

A profile look-up table is, used to determine a good approximation to the required time optimal reversal velocity reference. The velocity range between zero and a given velocity maximum is split up into sixteen sub-intervals. FIG. 11 shows the concept for the profile look-up table with each cross therein marking the location of a data point, for variations in distance to go after zero crossing, velocity limit, and stop point, as a function of velocity, all as shown in FIG. 7.

In regard to the velocity limits, the distances collected during the acceleration and the deceleration states can be calculated and then stored into the table for the distance element. Comparing the actual distance to go with the elements of this table, the conformist velocity interval can be detected. The detected velocity interval points to the maximum velocity profile and to the stop point. A distance to go between two velocity limits results in a time profile using the lower velocity limit and adding a constant velocity state until the stop point is reached.

The following equations are used to explain the method concerning the automatic setup of the parameters when a door opening or door closing time is given. The corresponding FIG. 6 shows the profile of the different states.

Figure 9:
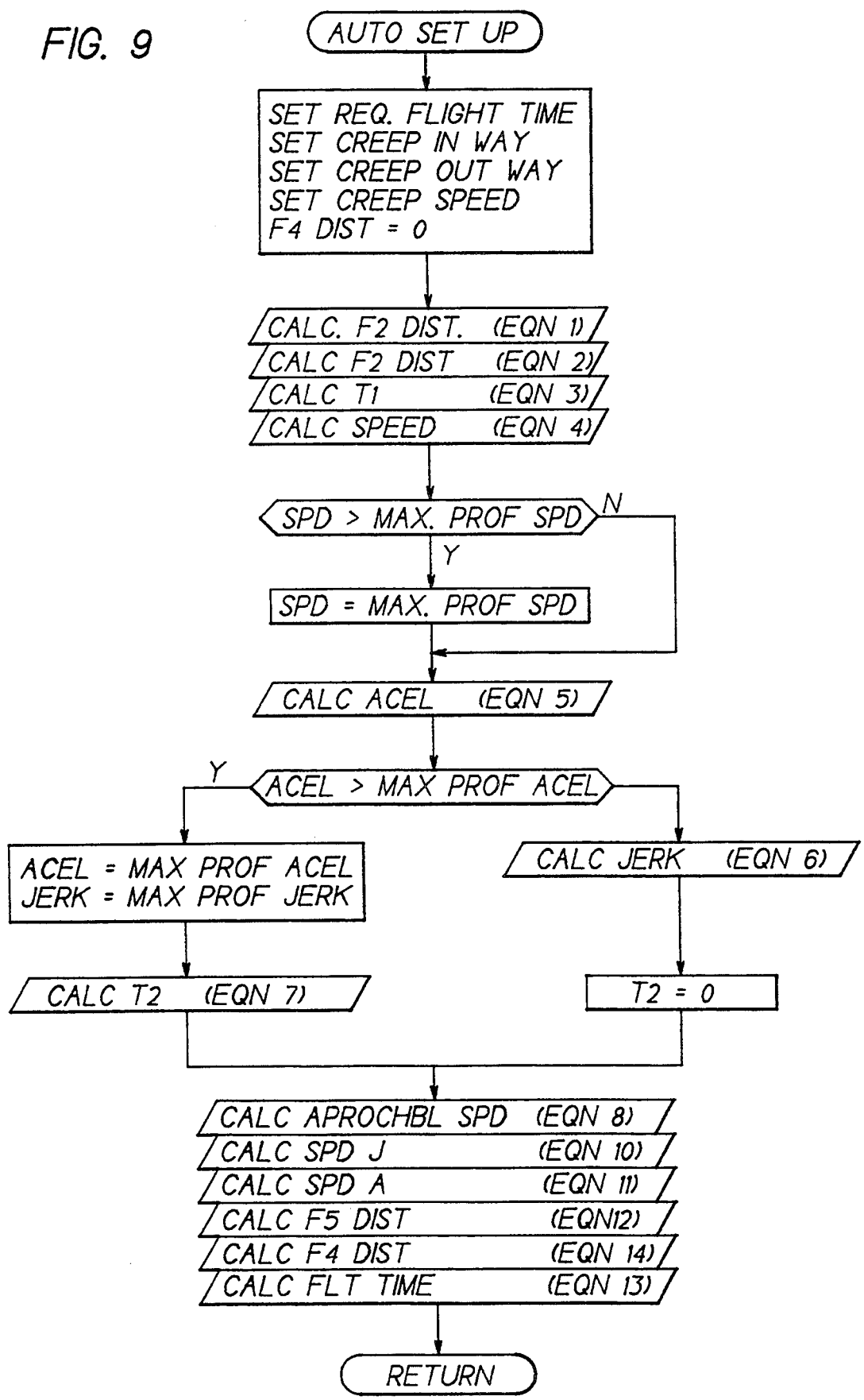
FIG. 9 illustrates the automatic set up of the door parameters.
Figure 10A:
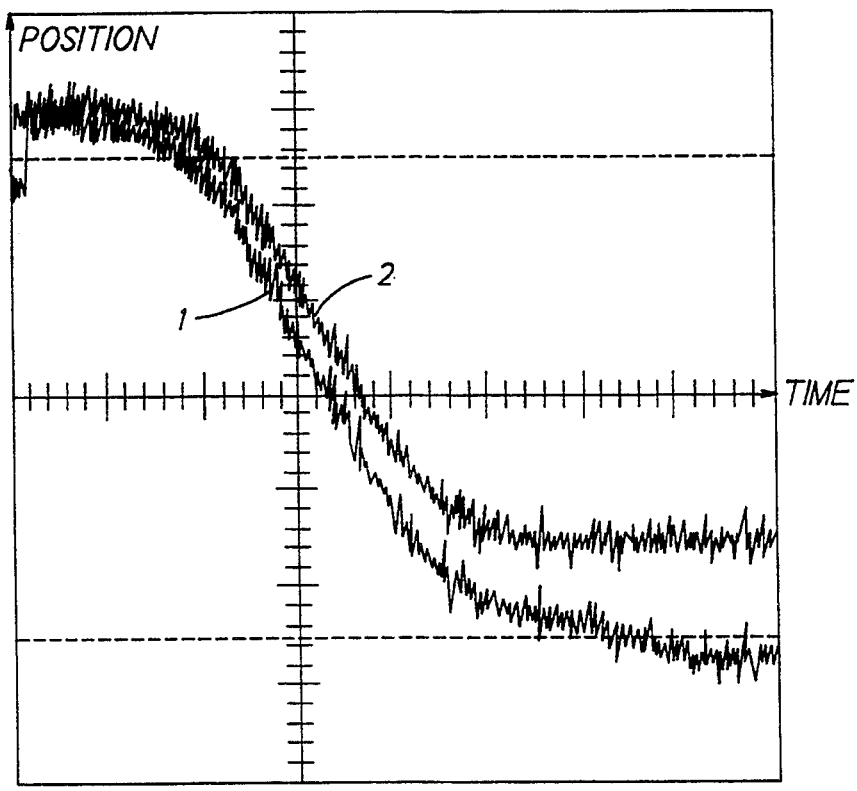
FIG. 10 illustrates dictated and measured position versus time that do not match before correction (illustration a) and that do match after correction (illustration b).
Figure 10B:
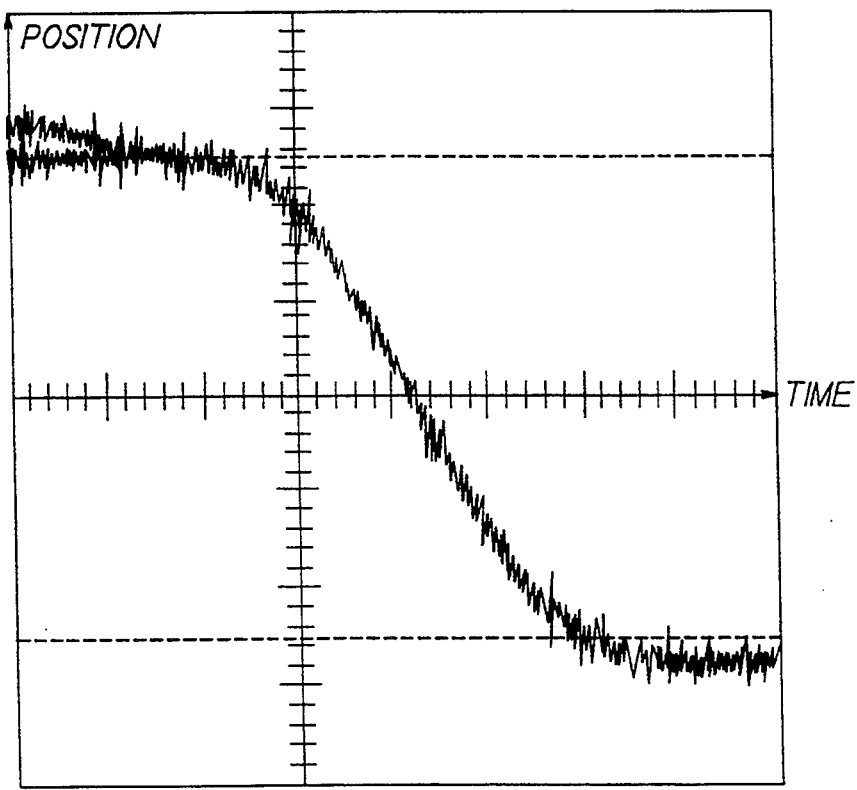

To have a smooth starting and stopping run, the profile generator has no constant acceleration phase unless acceleration or jerk limits are exceeded. If a very quick run is desired, the values of the jerk and the acceleration will be increased until the maximum velocity is reached. In case of the maximum velocity being exceeded, a constant velocity time will be inserted; otherwise, F4 equals zero. The auto setup procedure FIG. 9 is split up into the following six steps:

Step 1. Calculation of the acceleration distance F5.

The constant velocity segment is set to zero. Due to this, F4 is equal to zero. The distance F2 caused by the creep speed (as if there were no acceleration to a higher speed) is determined by:

$$F2 = \text{creep speed} * \text{req. flight time} * K1 \qquad \text{(Equation 1)}$$

where K1 is the constant parameter depending on the motor, the speed encoder, the used resolution, and the internal frequency scaling.

The acceleration distance is obtained by:

$$F5 = (\text{doorway} - F1 - F2 - F3 - F4)/2 \qquad \text{(Equation 2)}$$

with
F1 = creep in way
F3 = creep out way
F4 = 0.

Step 2. Calculation of maximum speed.

The constant acceleration segment is set to zero. That is, the acceleration consists only of a jerk-in and a jerk-out segment. The jerk-in and the jerk-out time T1 is given by the requested flight time.

$$T1 = \text{req. flight time}/4 \qquad \text{(Equation 3)}$$

The maximum speed now results in:

$$\text{speed} = F5/(K1*T1) \qquad \text{(Equation 4)}$$

If the speed is greater than the limit maximum profile speed, then the speed is set to maximum profile speed.

Step 3. Calculation of the acceleration.

The acceleration depends on T1 and the max speed.

$$\text{Acceleration} = \text{speed} * K2/T1 \qquad \text{(Equation 5)}$$

with K2: internal acceleration scaling constant.

If the acceleration is greater than the limit maximum profile acceleration, then the acceleration is set to the maximum profile acceleration.

Step 4. Calculation of the jerk.

If the calculated acceleration in Equation 5 was greater than the maximum profile acceleration, then the jerk also has to be set to its limit maximum profile jerk; otherwise, the jerk is obtained by:

$$\text{jerk} = \text{acceleration} * K3/T1 \qquad \text{(Equation 6)}$$

with K3: internal jerk scaling constant.

Step 5. Normalization of the maximum

If the jerk and also the acceleration were set to their maximum limits, perhaps a constant acceleration segment needs to be inserted. The duration T2 of this constant acceleration segment is:

$$T2 = \text{speed} * K2/\text{acceleration} \qquad \text{(Equation 7)}$$

The approachable speed used to determine jerk and acceleration is given by:

$$\text{speed} = \text{acceleration} * (T1 + T2)/K2 \qquad \text{(Equation 8)}$$

Step 6. Calculation of the flight time.

To obtain the flight time, the F4 distance during the constant velocity segment must be calculated to be able to determine the corresponding duration of this segment. The acceleration distance consists of one part caused by the jerk-in and jerk-out segments and a second part caused by the constant acceleration segment.

$$\text{Speed} = \text{speed-}J + \text{speed-}A \quad \text{(Equation 9)}$$

$$\text{With speed-}J = \text{acceleration} * T1 \quad \text{(Equation 10)}$$

and $$\text{speed-}A = \text{speed} - \text{speed-}J \quad \text{(Equation 11)}$$

With equation 10 and equation 11, the acceleration distance F5 results in:

$$F5 = \text{speed-}J * T1 * K1 + (\text{speed-}A * T2 * K1)/2 \quad \text{(Equation 12)}$$

The flight time can be calculated to:

$$\text{flight time} = [(4*T1 + 2*T2)*\text{speed} + F4/K1]/[\text{speed} + \text{creep speed}] \quad \text{(Equation 13)}$$

with $$F4 = \text{doorway} - F1 - F2 - F3 - F5. \quad \text{(Equation 14)}$$

This method for parameter setting of the profile generator is easy to handle because of the few parameters, just the opening time and the closing time, In addition, this low cost method changes the parameters in such a way that a velocity profile would be provided to achieve the desired quick run and a good stopping distance without oscillation when reversal occurs.

Various modifications and changes to the above description may be made without departing from the spirit and scope of the present invention.

We claim:

1. A method for opening or closing an elevator door, comprising:
   a) providing a requested flight time for said elevator door opening or closing;
   b) providing a requested creep in distance for said elevator door opening or closing;
   c) providing a requested creep out distance for said elevator door opening or closing;
   d) providing a requested creep speed for said elevator door opening or closing;
   e) calculating a requested acceleration distance, for setting the distance that said opening or closing elevator door is in an acceleration or deceleration state, in response to said requested creep speed, requested creep in distance, requested creep out distance, requested flight time, a doorway width, and a constant maximum velocity distance;
   f) providing a maximum elevator door speed, in response to said acceleration distance and a jerk-in/jerk-out time which is proportional to said requested flight time, for dictating a maximum speed said elevator may obtain when opening or closing;
   g) calculating an acceleration, dictated for said elevator door to experience in said acceleration state, in response to said maximum speed and jerk-in/jerk-out time;
   h) providing a jerk, which said elevator door will obtain during said opening or closing, said jerk being provided in response to said acceleration;
   i) providing a constant acceleration time, for which said elevator door is opening or closing at said acceleration in response to said maximum speed and said acceleration;
   j) providing a calculated flight time in response to said requested flight time, said maximum speed and said requested creep speed; and
   k) moving said elevator door from a closed or opened state to the alternate state at said requested creep speed for said creep in distance, then moving said elevator door in response to said jerk and acceleration for approximately said acceleration distance and time, then decelerating said elevator door at a rate proportional to said acceleration and jerk for approximately said acceleration distance and time, then moving said elevator door at said requested creep speed for said creep out distance, the total time for said elevator door movement being equal to said calculated flight time.

* * * * *